May 5, 1964  L. WALTON ETAL  3,131,972
COLD-WORKED BALL SEATS FOR FLAT SURFACES
Filed Oct. 3, 1961  2 Sheets-Sheet 1
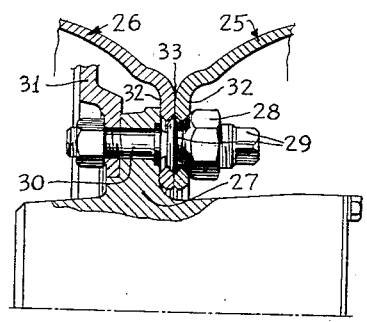
FIG. 5
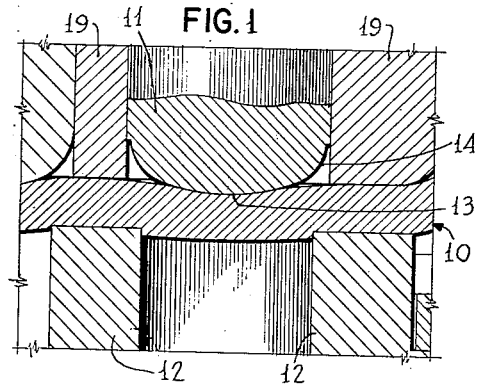
FIG. 1
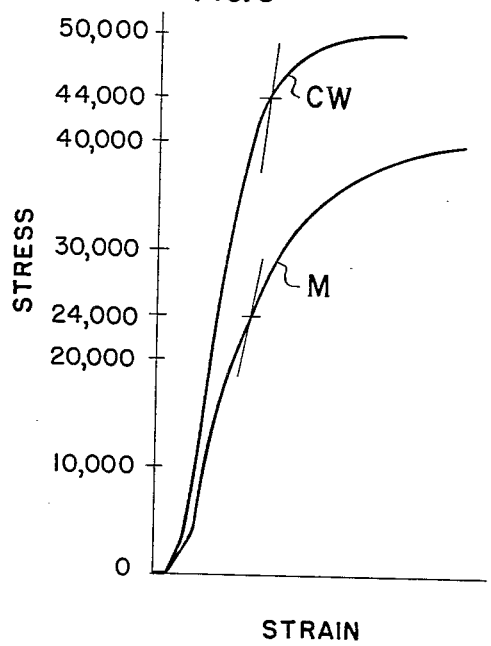
FIG. 6
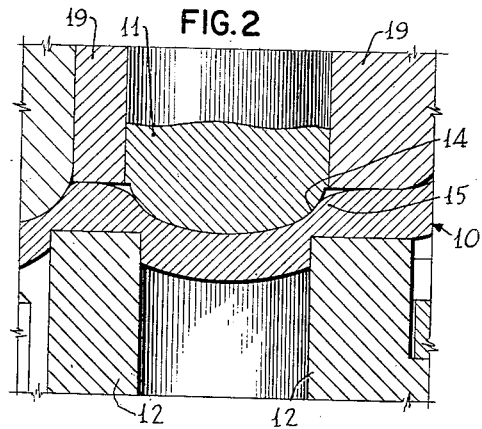
FIG. 2
FIG. 3
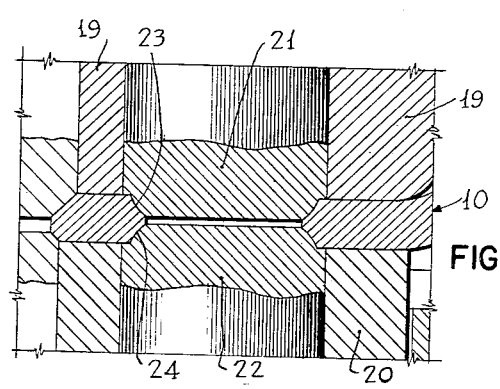
FIG. 4
INVENTORS
Leonard Walton
Patrick J. Hogan
BY John B. Boswell
ATTORNEY INVENTORS
Leonard Walton
Patrick J. Hogan
BY
*John B. Dowell*
ATTORNEY United States Patent Office 3,131,972
Patented May 5, 1964

3,131,972
COLD-WORKED BALL SEATS FOR FLAT SURFACES
Leonard Walton, Grosse Pointe, and Patrick J. Hogan, Mount Clemens, Mich., assignors to The Budd Company, Philadelphia, Pa., a corporation of Pennsylvania
Filed Oct. 3, 1961, Ser. No. 142,554
9 Claims. (Cl. 301—9)

This invention relates to the art of making cold-worked and cold-formed working surfaces for dual wheel disks, and more particularly to a method of making coined ball seats on flat surfaces without raising the metal surrounding the seat.

Dual wheel disks having flat mating flange surfaces at the seats have heretofore been made by machining the seating surfaces.

Disk wheels, such as those shown in Eksergian Patent No. 2,217,646, are made of resilient metal such as steel, and formed axially so as not only to secure a suitable resilience of the metal bodies against axial strains, but also to enable the wheel bodies carrying the tires to be mounted in pairs, side by side on the same hub of a wheel, if desired. The wheel disks are detachably connected to the hub by suitable fastening devices, such as bolts or studs and nuts, so that the wheel disk either with or without tires thereon, may be readily applied to, or removed from the hub of the wheel.

It has become common practice to build wheel disks with three distinct types of apertures therein. A central opening is provided in the geometric center of the disk to fit over the hub and axle which passes therethrough. This center hole may be made to approximately the dimension of the hub, or to fit on a raised alignment flange or lugs provided on the hub. Surrounding the central opening, each wheel disk is provided with a flat radially extending mounting portion, this mounting portion being provided with an annular series of circumferentially spaced bolt holes. Radially outward from the bolt holes in the axially formed portion of the disk a series of elliptically shaped hand holes are circumferentially spaced.

The prior art has long been concerned with making wheel disks stronger and more resistant to fatigue. Heavy duty truck wheels of the dual disks type have high stress concentration at the bolt holes where the disks are attached to each other and to the hub.

Two general methods have been employed to reduce bolt hole stress concentrations: a first method employs studs which are loosely fitted in the hub and are self centering. A second method is to provide a fixed stud with a floating nut. The former method is unsuitable for dual disk wheels which encounter heavy duty service. The latter method has been successfully employed with re-entrant seats in an inter-nesting engagement as shown in Eksergian Patent No. 2,597,835.

Stress concentrations at the bolt holes are largely caused by manufacturing inaccuracies in the spacing of the bolt holes in the disk. When the bolts are tightened down on the disk, points of high stress concentration are created at one or more of the bolt holes in the disk. During road service this stress is varied and causes minute cracks in the seating surfaces of the bolt holes. These cracks (sometimes called fatigue cracks) usually work radially until they terminate at one of the hand holes or the central opening, thus causing failure of the wheel disk.

It has been suggested that a greater number of bolt holes would more evenly distribute the stresses, but this has not been found to be the case. The greater the number of bolt holes over the number required to carry the load produces a greater chance of having one or more misaligned holes or studs. Moreover, the greater the number of bolt holes, the less the distance between bolt holes and hand holes where fatigue often occurs.

The general object of the invention is to provide cold-worked ball seating surfaces in the flat portion of a wheel disk solely by die-forming methods which increase the strength of the seat over the original strength of the base metal.

It is another object of the invention to produce bolt holes having cold-worked hardened and coined seating surfaces having superior yield strength characteristics.

It is another object of the invention to provide a method whereby all bolt holes of a wheel disk are produced and finished simultaneously by die-forming means, thus increasing the accuracy of the bolt hole spacing over machine formed and spaced bolt holes.

It is an additional object of the invention to provide a method of cold-forming and coining a seating surface in a flat plate without raising the metal around the seat.

It is an additional object of the invention to die-form all working seat surfaces of a wheel disk simultaneously to maintain critical spacing at low manufacturing cost.

It is a further object of the invention to provide cold-formed seating surfaces in a flat plate which are readily usable without any further machining operations.

It is a further object of the invention to provide a new and improved seating surface for wheel disks and the like.

These objects are attained in large measure by first drawing the metal in the area to be cold-worked opposite an extrusion die to pull the metal away from the area surrounding the seat to be formed and by continuing the operation coining a first annular seat in the metal, piercing or punching a critical amount of metal from the center of the area to be worked, and simultaneously cold-forming and coining a second annular seat in the opposite face of the metal to form a dual faced cold-work-hardened finished seating surface.

The manner in which this object is attained will become more fully apparent from the following detailed description when read in connection with the drawings forming a part of this specification.

In the drawings:

FIG. 1 is a cross-sectional elevation of the beginning of a first die-forming operation at one of the bolt holes;

FIG. 2 is a cross-sectional elevation of a final die position at the end of the first die-forming operation;

FIG. 3 is a cross-sectional elevation of a final die position at the end of the second die-forming operation;

FIG. 4 is a cross-sectional elevation of a final die position at the end of the third and final die-forming operation;

FIG. 5 is a partial cross-sectional elevation of dual wheel disks mounted back to back and mounted on a hub by means of wheel studs and bolts.

FIG. 6 is a stress-strain diagram comparing the relative strength of machined ball seats and cold-worked ball seats made by the present process.

Figure 7:
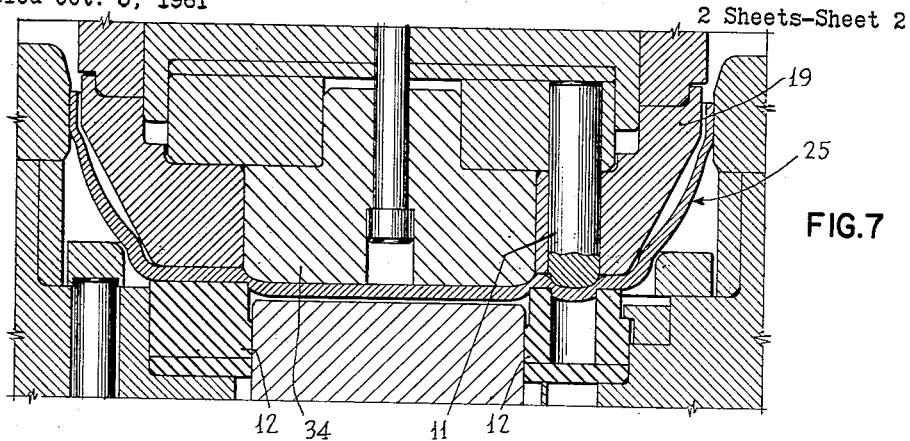
FIG. 7 is a cross-sectional elevation of a complete die arrangement for simultaneously forming the first die operation of all working surfaces of a wheel disk.

In order to more clearly explain the novel method, accepted descriptive terminology of operations is followed as closely as possible. Forming in the usual sense implies making a change in the shape of a workpiece in which the intention is other than to reduce the workpiece in thickness. Drawing in the usual sense implies a plastic flow of of the material in which the material is shaped by tension forming. Coining in the usual sense implies a closed die squeezing operation in which the surfaces of the work are confined or restrained. Restriking in the usual sense implies a sizing operation in which compressive strains are introduced into the material. Cold working in the usual sense implies any plastic flow of unheated material caused by applied external forces, and may result in a hardening of the material so cold-worked. Extrusion in the usual sense implies a plastic flow of metal through a die orifice.

As illustrated in FIG. 1, a wheel disk blank 10 is shown being draw-formed by a male drawing die 11 and extruded into the female extrusion die 12 which also serves as a blank holder. The front and side faces 13 and 14 of male die 11 pull or draw the metal 10, at the area of the seat to be formed, into the cavity formed by the female die 12.

FIG. 2 shows the position of the male die 11 at the end of the first die forming operation wherein the metal surrounding the front face 13 of the male die has been drawn and pressed into the extrusion die 12. The metal opposite the side face 14 is first drawn, and as the die 11 reaches its final position, the metal opposite the side face 14 is approximately over the rigid portion of the die 12 causing the metal 10 at area 15 to be cold-worked hardened by coining to the approximate finished contour of a ball seat. Metal at the area 15 is cold-drawn and cold-formed by the single operation without causing a backward extrusion of metal which would raise a ridge above the normal flat surface of the metal surrounding the bolt holes.

Sheet metal blank 10 is usually roller-formed at the steel mill which causes an orientation of the metal grain in the direction of rolling. Lamina lines of metal flow are in the longitudinal axis. An acid etch of rolled sheet reveals a homogeneous thickness of metal which is lamina in appearance indicating that the layers of metal are compressed in the direction of thickness, and the grain is elongated in the direction of length. It was discovered that the initial drawing process of FIG. 1 preserved the laminar structure and actually formed the grain lines to follow the contour of the male die 11 without opening the ends of the grain as occurs in machining. Thus, the metal at area 15 of FIGS. 2 and 3 is composed of converging laminar lines creating a much stronger and harder surface than the base metal from which it was formed. When male die 11 is pressed to its final position as shown in FIG. 2, the side face 14 of male die 11 cold-works the surface of the metal at area 15 causing an appreciable increase in surface hardness without opening the grain or breaking the lines of metal flow (or metal orientation) at the surface which forms the seat.

FIG. 3 shows the second die forming operation which consists of punching or removing a critical volume of metal 16 from the blank 10. The tear lines due to blanking are exaggerated to better illustrate the blanking principle. In actual practice the shear lines due to blanking are very uniform and entirely consistent, which permits the removal of a predetermined volume of metal 16.

Matching male punch die 17 and block die 18 cooperate to remove a metal slug 16 of predetermined volume. Dies 18 and 19 serve as blank holders in this operation.

By removing a critical volume of metal, as shown in FIG. 3, the partially formed seat may be ball-coined to final shape, as shown in FIG. 4, without necessitating the further removal of metal. In the coining operation of FIG. 4, the blank holders 19 and 20 which act as die restraints are clamped into position first and the male coining dies 21 and 22 are then pressed into the blank to form ball seats 23 and 24. Alternatively, blank holders 19 and 20 may be clamped into position, then die 21 may be held stationary and only die 22 pressed into position. The seat 23 is again cold-worked by the coining operation, and seat 24 is cold-worked by coining to final form in a single coining and forming operation. The blank holders 19 and 20 are locked into position when the dies 21 and 22 are pressed to final position causing the metal at the seating area to flow into the cavity defined by dies 19, 20, 21 and 22. A small clearance is provided between dies 21 and 22 to serve as a flash trap and assure a complete stroke of the dies. Ball coining increases the hardness of the seating surface to approximately double the hardness of a machined seat. Microhardness tests reveal that the surface of the seat and blank surface surrounding the bolt holes actually increased in hardness by as much as two and one-half times at the critical areas where surface cracks usually start. The die finished seating surfaces do not require further machining operations. If the seats had been machined in any way the advantage gained by cold-working and coining would be lost.

FIG. 5 shows two wheel disks 25 and 26 mounted back to back on a hub 27 by means of a double cap nut 28, 29 and stud 30. The stud 30 may also serve to retain a brake drum 31 to an inner face of the hub 27. FIG. 5 illustrates the importance attached to having both the inner face 32 and the back face 33 of wheel disks 25 and 26 perfectly flat. If the inner face 32 of wheel disk 26 is not perfectly flat it will not mount the wheel disk 26 and associated tire in perfect alignment with the mounting face of hub 27. This, in turn, would cause wheel disk 25 and associated tire to be out of perfect alignment even if wheel disk 25 had perfectly flat faces 32 and 33. It is apparent that if either back face 33 of wheel disks 25 and 26 is not perfectly flat, wheel disk 25 and associated tire will be out of alignment. It is also advantageous to have both flat faces 32 and 33 extremely hard as well as flat. The area at the edge of the ball seat has been cold-worked and hardened in the process of making the ball seat. If additional hardness of the total flat area is desired it may be accomplished by ball coining the flat area in a restrike operation. Flat hard seats provide surfaces free from spring-back or wear. When the wheel nuts are tightened on a hard surface the nut does not loosen, or lose torque which would increase stresses and cause bolt hole failure.

In order to provide a comparison of the seating surface produced by the novel method, a machined seat is compared with a cold-worked and coined seat in FIG. 6. Curve M shows that the yield point of the machined seat is reached at 24,000 p.s.i., which is relatively high for hot-rolled low-carbon sheet, but may be accounted for by the extreme care and precision afforded the machined test seat. Curve CW shows that the yield point of the cold-worked and ball-coined seat is reached at 44,000 p.s.i., which is average for the seat produced by the novel process.

It can be concluded that: the yield strength is approximately doubled; the grain structure is formed into a continuous uninterrupted grain flow at the ball seat; and the metal in the seat area is localized cold-work-hardened; all of which greatly resist fatigue failure. Moreover, the die forming process increases the accuracy of bolt hole spacing and maintains more accurate centers which eliminate a cause of stress concentrations and loss of torque. It has been found that the resistance to fatigue failure has been so greatly improved that fewer bolt holes and studs are actually required. When fewer bolt holes are employed, fewer hand holes may be employed, allowing greater distances between bolt holes and hand holes which also increases the resistance to fatigue failures.

The novel process is shown to have greatly extended the life of wheel disks and reduced the cost of manufacturing the disk.

Figure 8:
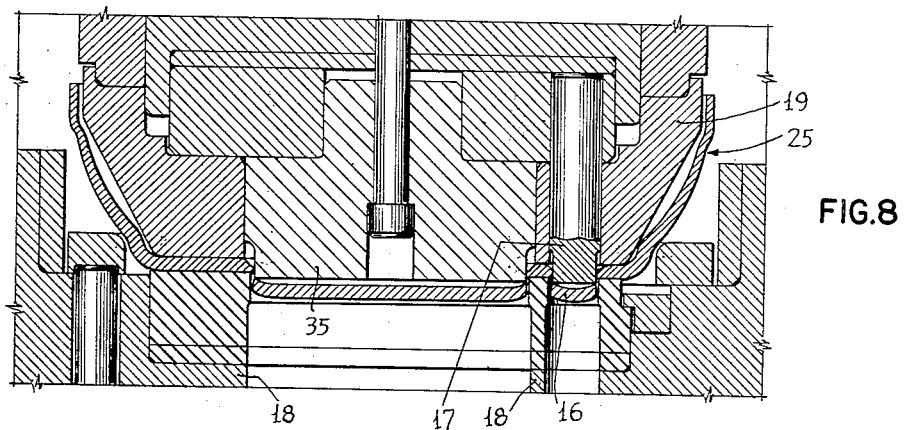
FIG. 8 is a cross-sectional elevation of a complete die arrangement for simultaneously forming the second die operation of all working surfaces of a wheel disk.
Figure 9:
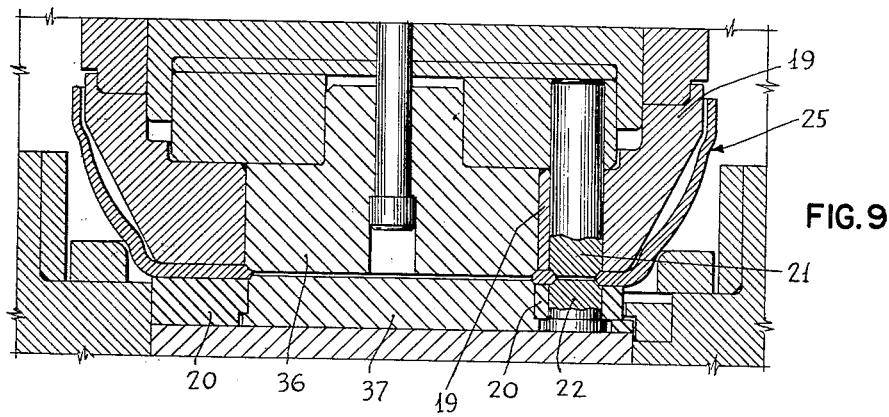
FIG. 9 is a cross-sectional elevation of a complete die arrangement for simultaneously forming the third and final die operation of all working surfaces of a wheel disk.

FIGS. 7, 8 and 9 show complete die assemblies for making all ball seat bolt holes and the center mounting hole simultaneously. The operations of FIG. 7 and FIG. 2 are the same. FIG. 7 shows the complete female die 12 which also provides the bottom opening for the center hole as well as the bolt holes. Male die 34 is shown cooperating with the center opening of female die 12 wherein the drawing and extruding operation is the same as explained hereinbefore with regard to FIGS. 1 and 2. It will be understood that male die 11 is composed of a plurality of individual dies such as die 11 shown, one for each bolt hole. The upper hold down ring 19 acts as a guide for the upper male dies 11 and 34, 17 and 35, and 21 and 36 in all three die forming operations thus maintaining extreme accuracy in the successive steps of the die forming operation.

FIG. 8 shows the second die forming operation employing the dies 17, 18 and 19 as shown in FIG. 3, and the additional male die 35.

In the final die forming operation shown in FIG. 9 the dies 19, 20, 21 and 22 are the same dies as shown in FIG. 4. The additional male dies 36 and 37 are employed to cold-work and coin the central opening which may be used as a precision surface to precisely mount the wheel disks 25 and 26 and hub 27 shown in FIG. 5.

In FIGS. 7, 8 and 9 the male and female dies 11 and 12 of FIG. 7 may be replaced in the die system by male and female dies 17 and 18 of FIG. 8. In like manner dies 17 and 18 may be replaced in the die system by male and female dies 21 and 20. In the preferred embodiment shown the additional coining die 22 fits within female die 20 and the group of dies 20, 21 and 22 are also interchangeable in the die system.

It will be understood that the wheel disk 25 shown in FIGS. 5, 7, 8 and 9 was first formed axially prior to the die forming operations described herein and does not constitute a part of this invention. The die holders, guides and stops shown are commensurate with die making practices presently employed and are considered to be self-explanatory.

The invention may be applied to objects other than the preferred embodiment of a wheel disk described herein.

It is possible to combine the first and last step of the novel method to provide a single seat recessed into a flat surface provided however, there is no requirement that slug 16 be removed as is the case with ball socket joints.

Various modifications and changes may be made in the arrangement of the dies without departing from the scope of the invention, some of the novel features of which are defined in the appended claims.

What is claimed is:

1. The method of making cold-worked seating surfaces in the flat portion of a wheel disk by die-forming comprising, providing a plurality of male drawing dies and a plurality of female extrusion dies interconnected into a composite die system, the step of simultaneously drawing, forwardly extruding and coining said wheel disk with said drawing and extruding dies in local areas of the flat portion defined by the dies to produce a plurality of upper seating surfaces, providing a plurality of male punch dies and a plurality of female block dies interchangeable with said drawing dies and said extrusion dies in said die system, the step of simultaneously punching critical volumes of metal from said wheel disk at the areas previously forwardly extruded, providing a plurality of male coining dies and a plurality of restraining dies interchangeable with said drawing dies and said extrusion dies in said die system, and the step of simultaneously coining a plurality of lower seating surfaces and finishing said upper seating surfaces in said wheel disk at the areas previously coined.

2. A wheel disk having cold-work-hardened seating surfaces comprising, an axially formed wheel disk having a radially flat mounting surface, said disk being formed from a flat hot rolled sheet steel having a lamina grain orientation in a longitudinal direction, and a pair of cold-worked-coined hardened seating surfaces in said steel sheet converging the grain orientation of said sheet from the flat sides of said sheet to provide said hardened seating surfaces having a yield strength approximately double the yield strength of said hot rolled steel sheet.

3. Cold-work-coined seating surfaces for a flat metal plate, comprising a flat metal plate of hot rolled steel having longitudinal elongated grain structure between plane areas, and two coined cold-work-hardened seating surfaces formed between the plane areas of the flat metal plate having a grain contour which follows the contour of the seating surfaces, said coined cold-work-hardened seating surfaces having a yield strength double the yield strength of said hot rolled steel plate.

4. The method of making hardened annular seats in a flat metal plate,
    clamping said flat metal plate at its upper and lower surfaces between axially aligned upper and lower retaining dies,
    said upper retaining die being provided with a hollow circular bore,
    said lower retaining die being provided with a hollow circular extrusion orifice smaller in diameter than said circular bore,
    tension drawing said upper surface of said plate with a convex nose male drawing die concentrically fitted in said bore, said drawing die being of greater diameter than said extrusion orifice, and
    simultaneously forwardly extruding the lower surface of said plate into said orifice with said drawing die during the initial axial movement of said convex nose male drawing die,
    cold-work-hardening by coining an upper annular seat between the surfaces of said plate, and
    simultaneously forwardly extruding the lower surface of said plate into said orifice during the final axial movement of said convex nose male drawing die,
    piercing a circular slug from said blank whose diameter is approximately equal to the diameter of said orifice of said retaining die and includes the forwardly extruded lower surface,
    cold-work-hardening by coining a lower annular seat between the surfaces of said plate, and
    simultaneously reshaping said first annular seat producing thereby two finished symmetric coined annular seats in said flat metal plate below the surfaces of said flat metal plate having a yield strength approximately double the yield strength of said flat metal plate.

5. A die forming method of coining cold-work-hardened seating surfaces in flat steel plate comprising the steps of:
    clamping a perimeter of a circular area of said plate in which a seating surface is to be formed between an upper and a lower retaining die,
    said upper retaining die being provided with a hollow circular bore and said lower retaining die being provided with a hollow circular extrusion orifice axially aligned with said bore and smaller in diameter than said bore,
    axially moving a convex nose male drawing die of greater diameter than said orifice into contact with said circular area of the upper surface of said plate,
    drawing by tension forming said upper surface of said plate,
    simultaneously forwardly extruding the lower surface portion of said plate into said orifice during the initial axial movement of said convex nose male drawing die,
    simultaneously while forwardly extruding said lower surface of said plate into said orifice cold-work-hardening by coining an annular seating surface below said upper surface of said plate,
    piercing a circular slug defined by said extruded portion of said circular area removing all projections from said metal plate,
    and cold-work-hardening coining an annular seating surface above the lower surface of said metal plate while simultaneously reforming said first seating surface at said upper surface of said metal plate producing thereby two finished symmetric coined-cold-workhardened seats between the surfaces of said flat metal plate having a yield strength approximately double the yield strength of said flat metal plate.

6. The method of coining cold-work-hardened seating surfaces below the surfaces of a flat metal plate having upper and lower parallel plane surfaces consisting of the steps of:

clamping said flat metal plate between concentrically aligned upper and lower retaining dies having flat faces said upper retaining die being provided with a hollow cylindrical bore defining on said upper surface of said plate a circular area of said flat metal plate to be formed, said lower retaining die being provided with a circular orifice of smaller diameter than said cylindrical bore defining on said lower surface of said plate a circular area to be removed from said flat metal plate, forming said flat metal plate by axial engagement of a male drawing die with the upper surface of said flat metal plate to first engage with said male drawing die an area of said upper surface smaller than and directly opposite to the area of said orifice opening to draw in tension said upper surface of said plate and simultaneously forwardly extruding said lower surface of said plate into said orifice and by subsequent continued axial movement of said male drawing die to continue forwardly extruding said plate into said orifice and simultaneously cold-work-hardening by coining a portion of said circular area to be formed lying between said male drawing die and said flat face of said lower retaining die creating a first cold-work-hardened annular seating surface contiguous with the upper parallel plane of said plate, removing the forwardly extruded portion of said plate, and simultaneously coining a second annular seating surface contiguous with said lower parallel surface of said plate and reforming said first cold-work-hardened annular seating surface at said upper surface of said plate by coining said lower seating surface with a coining die and employing a matched coining die as a die block retainer at the upper seating surface.

7. A method of coining in a flat metal plate having an upper and lower surface a pair of annular hardened seating surfaces by the steps of:

clamping a circular area of said plate between an upper and a lower retaining die, stretch-drawing the upper surface of said metal plate and simultaneously forwardly extruding said lower surface of said metal plate while coining to cold-work-harden a first of said pair of said annular hardened seating surfaces below said upper surface of said metal plate, blanking the center of said circular area to remove a slug including said forwardly extruding area and leaving said first of said pair of said annular hardened seating surfaces below said upper surface of said plate, coining the annular portion of said metal plate opposite said first of said pair of said annular hardened seating surfaces at said lower surface of said metal plate flowing metal away from said lower surface of said plate to form and to cold-work-harden the second of said pair of said seating surfaces above said lower surface of said metal plate and simultaneously flowing metal toward said upper surface of said plate to reform and cold-work-harden said first of said pair of said annular hardened seating surfaces.

8. The method of coining hardened seating surfaces in a flat metal blank comprising the steps of:

clamping an isolated circular area of said metal blank at its upper and lower surfaces between an upper and lower retaining die to restrain axial and lateral movement of said metal blank, said upper die being provided with a hollow axial bore, said lower die being provided with a cylindrical extrusion orifice axially aligned with said hollow axial bore, said orifice being of lesser diameter than said bore, drawing said isolated area of said metal blank with a rounded end drawing die axially slidable in said bore of said retaining die, and simultaneously forwardly extruding said lower surface of said blank in said orifice of said lower die with said drawing die, and simultaneously cold-work-hardening by coining a first seating surface contiguous with said upper surface of said plate with said drawing die to form a first hardened annular seating surface, blanking a cylindrical opening in said metal plate by removing said forwardly extruded portion of said plate, coining said upper surface and said lower surface of said plate between identical coining dies to form a second seating surface contiguous with said lower surface of said plate and simultaneously reforming said first seating surface contiguous with said upper surface of said plate providing thereby finished cold-work-hardened seating surfaces in a flat metal plate having a yield strength at least 50% greater than the yield strength of the original flat metal plate.

9. The method of making cold-work-hardened seating surfaces in a steel plate by die forming operations comprising the steps of:

clamping a circular area of said plate at its upper and lower surface between axially aligned upper and lower retaining dies, said upper retaining die being provided with a hollow circular bore and said lower retaining die being provided with a hollow circular extrusion orifice smaller in diameter than said circular bore, deforming the upper surface of said plate with a rounded nose male drawing die of greater diameter than said orifice to draw by tension forming said upper surface of said plate, and simultaneously deforming said lower surface of said plate by forwardly extruding the lower surface of said plate into said orifice by axial movement of said rounded nose die, and coining a first annular seat intermediate said upper and lower surfaces by cold-work-hardening and coining said annular ring with said rounded nose die, said annular seat being of greater diameter than said orifice, removing said forwardly extruded portion of said plate by blanking a slug from the plate to provide an aperture therein, and coining a second seating surface at the perimeter of said aperture at the lower surface of said plate while confining the upper surface of said plate and said first annular seat to the desired finished contour providing thereby a pair of back to back coined-cold-work-hardened seating surfaces in said steel plate.

References Cited in the file of this patent

UNITED STATES PATENTS

| | | |
|---|---|---|
| 1,368,565 | Limont | Feb. 15, 1921 |
| 1,695,476 | Winkler | Dec. 18, 1928 |
| 2,377,558 | Johnson | June 5, 1945 |
| 2,478,962 | Ziehmer | Aug. 16, 1949 |
| 2,697,953 | Chapman | Dec. 28, 1954 |
| 2,844,409 | Eksergian | July 22, 1958 |
| 2,913,811 | Benson | Nov. 24, 1959 |
| 2,934,813 | Nippert | May 3, 1960 |
| 2,980,993 | Lyon | Apr. 25, 1961 |